(12) United States Patent
Zaninotti

(10) Patent No.: US 7,984,501 B2
(45) Date of Patent: Jul. 19, 2011

(54) COMPONENT-ORIENTED SYSTEM AND METHOD FOR WEB APPLICATION SECURITY ANALYSIS

(75) Inventor: Thiago Zaninotti, Sao Paolo (BR)

(73) Assignee: ZMT Comunicacoes E Technologia Ltda., Sao Paulo (BR)

( * ) Notice: Subject to any disclaimer, the term of this patent is extended or adjusted under 35 U.S.C. 154(b) by 1109 days.

(21) Appl. No.: 11/730,663

(22) Filed: Apr. 3, 2007

(65) Prior Publication Data

US 2007/0234415 A1 Oct. 4, 2007

Related U.S. Application Data

(60) Provisional application No. 60/788,094, filed on Apr. 3, 2006.

(51) Int. Cl.
*G06F 21/00* (2006.01)
(52) U.S. Cl. .............. 726/23; 726/22; 726/24; 726/25

(58) Field of Classification Search ............. 726/22–25; 713/189–194; 717/107, 120, 143
See application file for complete search history.

(56) References Cited

U.S. PATENT DOCUMENTS

| | | | |
|---|---|---|---|
| 2003/0188194 A1* | 10/2003 | Currie et al. .................. | 713/201 |
| 2004/0049698 A1* | 3/2004 | Ott et al. ........................ | 713/201 |
| 2007/0128899 A1* | 6/2007 | Mayer .......................... | 439/152 |
| 2007/0157311 A1* | 7/2007 | Meier et al. .................... | 726/22 |

* cited by examiner

*Primary Examiner* — Vivek Srivastava
*Assistant Examiner* — Helai Salehi
(74) *Attorney, Agent, or Firm* — Stein McEwen, LLP

(57) ABSTRACT

A method and system analyzes the state of security of a web application based on the structure of its components and its behavior against a well determined set of fingerprints. The system searches for components while parsing the web application, applying the well determined procedures to identify the server side technologies involved. Based on information stored in memory, the system elaborates a set of security checks to determine any vulnerabilities.

10 Claims, 4 Drawing Sheets

FALSE-POSITIVE DETECTION ACTIVITIES DIAGRAM FOR COMPONENT-ORIENTED WEB APPLICATION SECURITY ANALYSIS METHOD

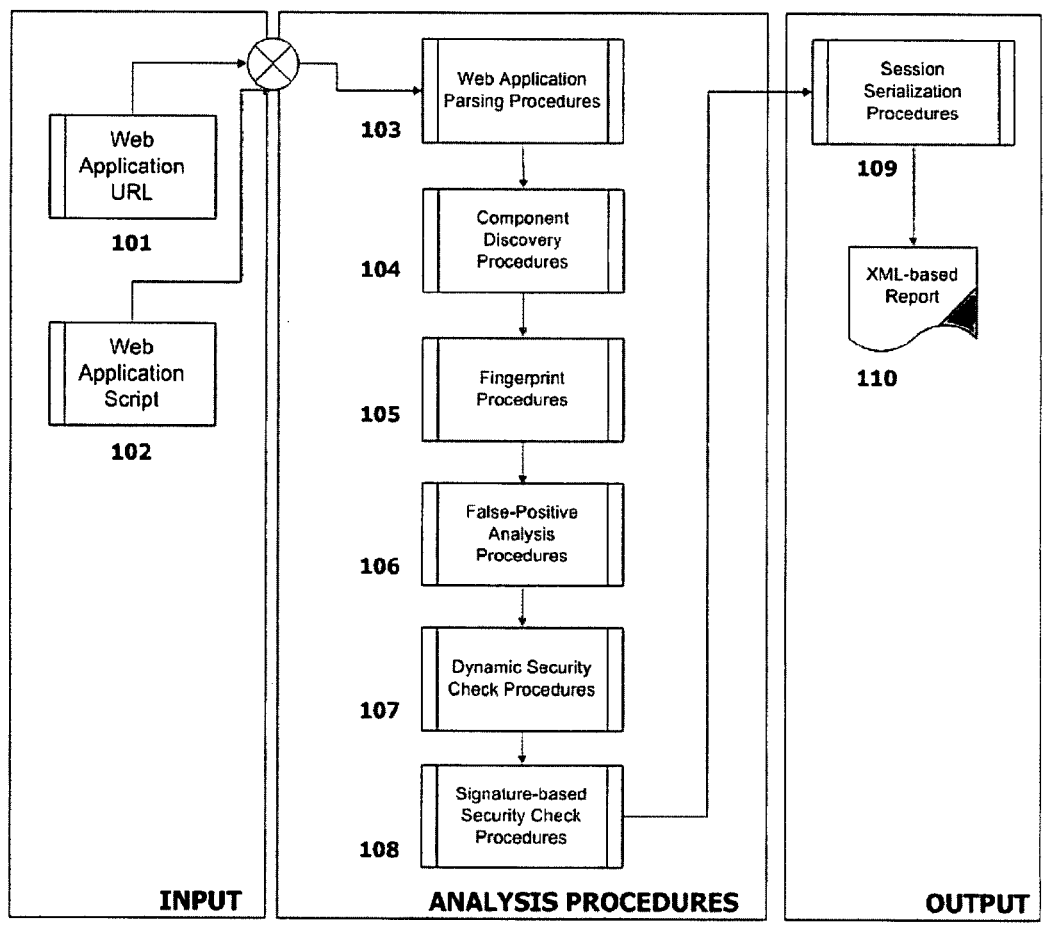
(FIG. 1)

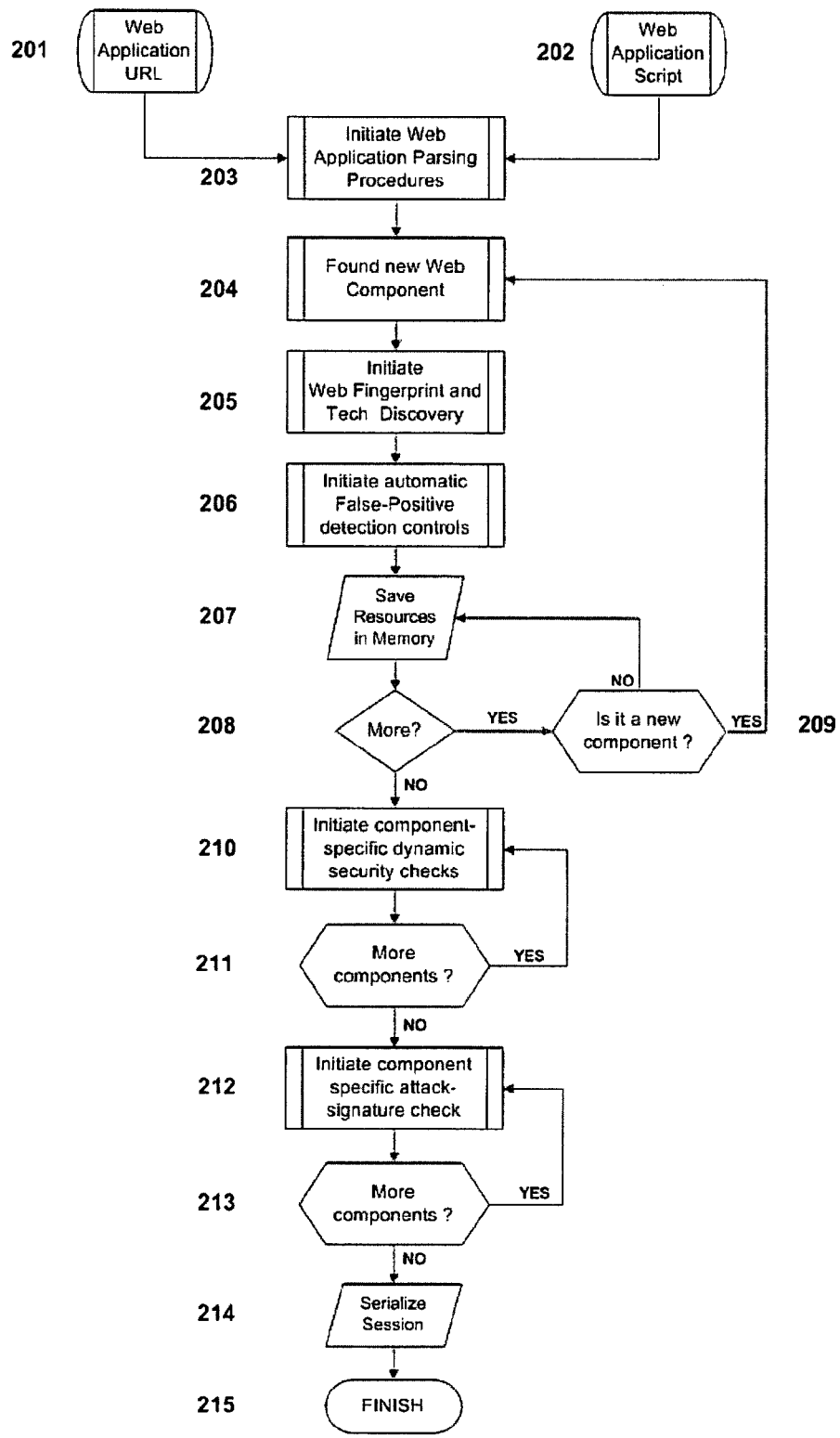
(FIG. 2)

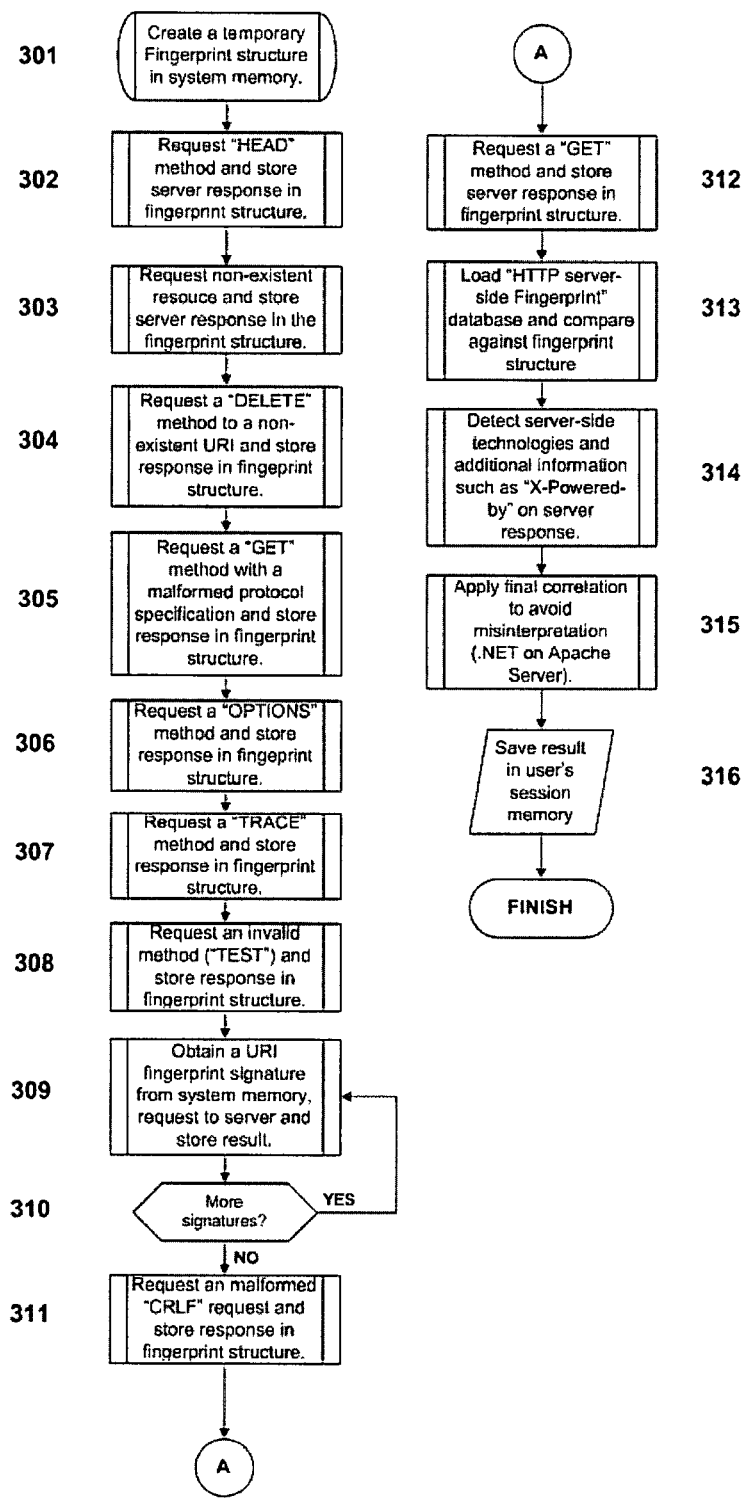
(FIG. 3)

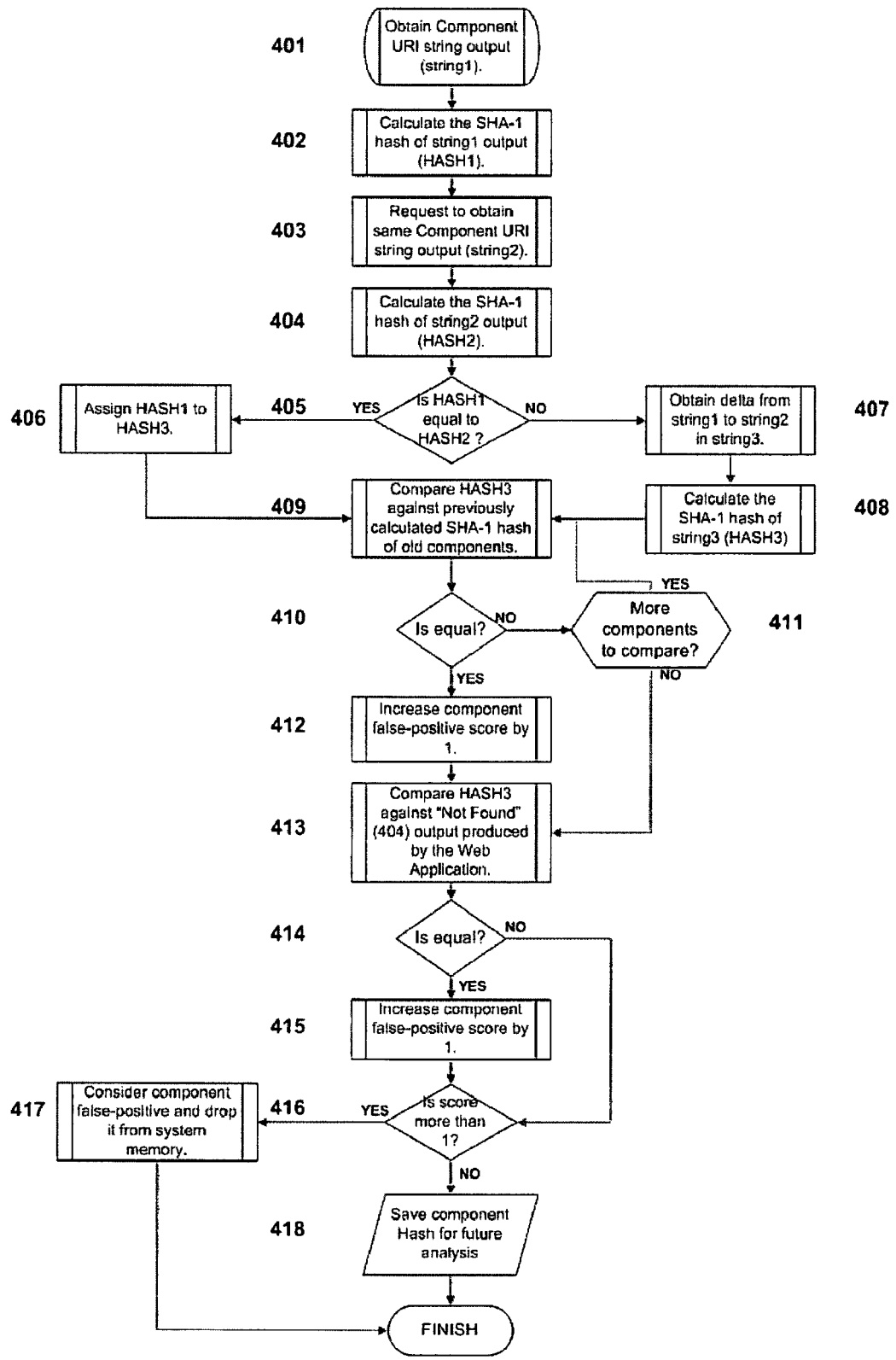
(FIG. 4)

COMPONENT-ORIENTED SYSTEM AND METHOD FOR WEB APPLICATION SECURITY ANALYSIS

CROSS-REFERENCE TO RELATED APPLICATIONS

This application claims benefit of provisional application 60/788,094, filed Apr. 3, 2006.

BACKGROUND OF THE INVENTION

For many years, businesses, governments and educational institutions have invested in information systems to integrate technology into people's lives. Technology standards, such as the HTTP protocol and HTML language have emerged as a solution for common problems. These technology standards form the basis of web applications. Currently, systems are being converted to become web enabled systems, replacing old terminal and client server architecture. These web systems are no longer a simple repository of data but are capable of handling millions of transactions per second.

Web applications are becoming integrated into people's lives as a recent survey by Bank of America indicates that more than five million customers are using their electronic banking services. Also, according to Jupiter Research Forecast, the number of households banking online will increase from 29.6 million to 56 million by 2008 with those paying bills online increasing from 50% in 2003 to 85% in 2008.

The concern regarding web applications includes the level of security. It is estimated that credit card fraud will reach 3.2 billion dollars in 2007 causing the credit card industry to issue several programs for data security compliance.

With the demand for complex web applications, the technology to design, develop and test the web applications has evolved. Modern applications are built on components, an object that can be reused for different applications for a group to form new components, develop internally or provided by third parties. This object orienting programming forms a basis of architecture. Object orienting programming language, such as Java, Visual Basic and C++ are widely known, reducing costs while reusing shared components. Web applications now use multilayer architectures due to the need for integration among different commercial partners and technologies. Component based applications present the easiest way to interface among different protocol and standards. Large technology providers are delivering web development products and frameworks based upon component-oriented architecture. The need for component-oriented methods for web application security analysis is emerging quickly to allow users to quickly adhere to regulations and provide security for their web applications.

SUMMARY OF THE INVENTION

A method and system analyzes the state of security of a web application based on the structure of its components and its behavior against a well determined set of fingerprints. The system searches for components while parsing the web application, applying the well determined procedures to identify the server side technologies involved. Based on information stored in memory, the system elaborates a set of security checks to determine any vulnerabilities.

BRIEF DESCRIPTION OF THE DRAWINGS

FIG. 1 is a flow chart of the architecture of the component-oriented web application security analysis method;

FIG. 2 is an activity diagram for the component-oriented web application security analysis method;

FIG. 3 is a detailed flow chart of the web fingerprint and technology discovery; and FIG. 4 is a detailed flow chart of the false positive detection activities.

DETAILED DESCRIPTION OF THE INVENTION

The system and method identifies the technology components used to construct a web application and creates a set of individual security checks based on the components' characteristics. FIG. 1 depicts the components of the system. The set of information concerning the location of the web application to be evaluated is stored at the web application's URL 101 or web application script 102. The information is subjected to a web application parsing procedure 103. The appropriate method to parse the web application is chosen according to the information provided as input by the URL 101 or script 102. After parsing, the information is sent to Component Discovery Procedures 104 to determine the presence of a new web component. After the component discovery procedure 104, an appropriate method to analyze the information received from the procedure 104 compares its behavior and patterns with common databases to determine the type of technology related to the web components at the Fingerprint Procedure 105, to be more fully explained later.

Next, at the False Positive analysis procedure 106, an appropriate method applies a set of procedures to identify if a given web component is in fact part of the web application and stores its uniqueness, preventing it from being detected again or ambiguously interpreted. Following the False Positive procedure is a Dynamic Security Check procedure 107 where an appropriate method employs a set of dynamic constructed relevant security checks against a given web component, based on the technologies discovered by the fingerprint procedure 105. Afterwards, the security based security check procedures 108 employs a database of attack signature security checks against a given web component based on the technology discovered by the fingerprint procedure 105.

The output of the analysis procedures 103-108 results in the session serialization procedure to transform the result data stored in the memory into a data structure stored in a disk-based file. Lastly, an XML based report provides a portable output format to retain the result structure produced by the system and its methods.

The flow chart of the process is shown in FIG. 2. The user provides a web application location information by providing a web application URL 201, the uniform resource location containing the address of the web application to be analyzed, or provides a web application script 202, a set of uniform resource locations and request input data used as a script to navigate through the web application to be analyzed. A user session memory is generated once the process is started. The session memory is the random access memory space temporarily storing the information of the system.

The system initiates the web application parsing procedure 203, looking for web links, images, JavaScript code, HTML meta tags and hyperlinks representing a reference to the web application itself. This information is then stored in the user's session memory and used for future analysis. Once a reference is found, the system identifies the type of web component 204 involved and saves the reference in the user's session memory. Thereafter, the system initiates the web fingerprint and technology discovery 205 procedure to identify the type of technology related to the component. An example of the Web Fingerprint and Technology procedure is depicted in FIG. 3. The system requests the following sequence of HTTP methods under the components uniform resource identification (URI):

- A HEAD method request such as "HEAD $component.uri HTTP/1.0" and stores the request for the response 302;
- A malformed URI request, a concatenation of the Component's URI with a non-existent resource such as "$component.uri/NONEXISTENTRESOURCE" and store the request for the response 303;
- A DELETE method request to a malformed URI, again a concatenation of the component's URI with a non-existent resource such as "$component.uri/DELETERESOURCETEST" and stores the request for the response 304;
- A malformed request method with an invalid protocol specification such as "GET $component.uri FAULT/1.0" and stores the request as a response 305;
- An OPTIONS method request such as "OPTIONS $component.uri HTTP/1.0" and stores the response 306;
- A TRACE method request such as "TRACE $component.uri HTTP/1.0" and stores the response 307;
- An invalid method request such as "TEST $component.uri HTTP/1.0" and stores the response 308;
- A GET request to a set of signatures collected from a database that may indicate the presence of a determined technology such as "GET $component.uri/_vti_bin/_vti_adm/fpadmdll.dll HTTP/1.0", indicating the presence of a front page technology 309;
- Step 309 is repeated for each signature;
- An invalid CRLF (\r\n) request without any other character and stores the response 311; and
- A valid GET request "GET $component.uri HTTP/1.0" and stores the result 312.

The system matches the result stored in each phase listed above against a provided database of well known patterns and behaviors to determine the technology related to the web component 313. The system also searches for common file extensions, HTTP headers (X-Powered-By) or custom fields that may represent the presence of a determined technology 314. All information is correlated to avoid misinterpretations, such as detecting the presence in the web component of a Apache server technology and Microsoft's ASP.NET technology 315. Instead of one component, the system may find two different components. One component may be forwarding data to another as a means of HTTP reverse proxy mechanism. After the process is complete, all gathered information is saved in the user's session memory 316.

Once the type of technology related to the web component has been detected, the system initiates the automatic false/positive detection control 206 to avoid ambiguous interpretation and false detection. The system performs the following procedures such as the example shown in FIG. 4:

- Obtain string output ("string1") from Web Component URI response 401;
- Calculate a mathematic has representation of "string1" using public algorithm SHA-1[14] 402;
- Initiate a new request to obtain same Web Component's URI string output ("string2") 403; calculate the mathematic has representation of "string2" using public algorithm SHA-1 404—here called "HASH2";
- Check to see if "HASH1" sequence is equal to "HASH2" sequence 405. If so, assign "HASH1" sequence to "HASH3" sequence (which will be used for future comparisons) 406. If not so, obtain delta (differences) from "string1" to "string2" in "string3" using public algorithm SHA-1 408—here called "HASH3";
- Compare "HASH3" sequence against a list of previously generated Web Application components SHA-1 has sequence 409. If it is equal, increase current component's false/positive score by 1 412. If not so, check if there are still available Web Application components to compare 411;
- Compare "HASH3" sequence against the previous calculated SHA-1 mathematic hash representation of "Not Found" (HTTP Code 404) response produced by the Web Application 413. If it is equal, increase current component's false/positive score by 1 415. If not so, do no operation.
- Check to see if current component's false/positive score is a non-zero value 416. If so, consider current component as a false/positive (interrupting any further processing with this component) 417. If not so, save component hash for future false/positive comparisons 418.

If the web component's false positive score is elevated, it may be considered a false positive URI and can safely be started by the system by removing the web component from the session memory. Otherwise, the web component can be safely considered and the mathematical hash output stored for future comparison.

Once the legitimacy of the web component has been decided favorably, the web component's resources, including server string, URI, technology, etc., it is save by the system in the user's session memory for future use 207. Thereafter, the system checks for the existence of more resources to be evaluated 208. If there are more resources, the system checks to see if the URI belongs to the same web component previously evaluated 209. If so, the system reverts back to procedure 204 and initiates a check. Otherwise, the system goes to procedure 207 and saves the URI in the same current web component's resource. Once no more components are needed for evaluation, the system initiates a dynamic security check based on each component's characteristics 210. The following checks will be performed against the web component:

- The Open Web Application Security Project (OWASP) top 10 vulnerabilities analysis, checking for the existence of security flaws related to the development of the set of Uniform Resource Information (URI) under the web component, such as cross-site scripting errors and SQL injection errors. During the analysis, the user input parameters of the component's URI may be changed and the request submitted to the server to evaluate the response. A set of patterns from a provided database are matched against the response to determine if the application is vulnerable. If this is not needed, the system will look only into the web component's output and type to determine if the application is vulnerable.
- A component-based vulnerability analysis in which the system determines the type of technology and looks for a provided database of attacks to be constructed against the web component's set of URIs. For example, an open-source PHP web component will cause the system to try to append a set of well known HTTP variables with invalid parameters to simulate a remote file include attack, a characteristic of PHP-based components.
- A parameter tampering test in which the system will change the user input values of a web component's URI, according to the type of related technology. The system then generates a mathematical hash of the normal output, the suspected behavior. The system that submits the transformed URI and will generate a mathematical hash of the result. If the results have changed, the system may infer the web application is vulnerable to a particular attack.

Each detected vulnerability is stored in the session memory and will remain there until it is serialized into a portable store format. The system then checks the availability of any untested web components 211 and repeats these steps at 210.

The system also initiates a component specific attack-signature security check 212. The system gathers a set of well known attack signatures provided in a database and requests resources to the server using the following procedure:

Based on the web component's technology, the system separates the class of attack-signatures to be used, such as Microsoft IIS-based components receive Microsoft-based signatures by not Apache server based signatures. The system analyzes the web component's set of URIs to determine directories and custom locations to compose dynamic values of the attack-signatures. For instance, an Apache web component may have an URI /cgi-bin/test.cgi, an attack signature that exploits PHF CGI may be issued /cgi-bin/phf.

The system requests the constructed URI to the server and stores the results. The value is compared against the database of common values for the particular vulnerability. If there is a match, the system will run a set of tests against the stored values of the false/positive detection controls 206 to determine the presence of the vulnerability.

Each detected vulnerability is stored under the user's session memory and remains there until it is serialized into a portable store format.

The procedure is repeated for each web component. After the system has finished the procedures above, it initiates the session serialization procedure 214. The stored results are scanned and a data structure to be stored is constructed in a portable file format such as XML. The system will keep the information about the web components, the web component's set of URIs and vulnerability. The system concludes after operating after saving all information in the user's provided disk media.

While the invention has been described with reference to a preferred embodiment, variations and modifications would be apparent to one of ordinary skill in the art. The invention encompasses such variations and modifications.

I claim:

1. A scanning apparatus to support the execution steps of a web application security analysis on a component-oriented context, comprising:
   a) scanning hardware based on multi-bit instruction processor technology to support a software component;
   b) a first engine to parse and retrieve web components from web application;
   c) a second engine to interpret and detect web components on web scripts;
   d) a scanning engine to analyze components and determine their relationship with a target web application and run security checks;
   e) a fingerprint database stored in a database which contains a large number of common patterns for platforms, web servers, and databases;
   f) a false-positive database stored in a database to assist in determining possible false-positives during discovery process;
   g) a transactions database for storing web application components and inferences from the first engine, the second engine, and the scanning engine;
   h) a report engine to transform the database data into a final result analysis containing recommendations for fixing issues; and
   i) an XML library to transform the final result analysis into a portable data format.

2. The scanning apparatus of claim 1 wherein said first engine is a Spider engine, said second engine is a JavaScript engine, and said library is an XML library.

3. A method of web analysis comprising the steps of:
   a) inputting a web application based on its URL;
   b) parsing the web application into web components using a first engine and a second engine and storing the results of the parsing phase, in a database;
   c) determining the presence of any new web components using the first engine and the database results;
   d) using a technology related to the web component scanning engine and a set of web server response patterns retained in fingerprint database for determining the technology related to the web components;
   e) determining if the new web component is part of the web application using a joint query analysis of the data stored in the database;
   f) determining and applying a correct set of security checks against the web component bases on the fingerprint data stored in the database;
   g) determining and applying a correct set of attack signatures against the web component based on the fingerprint data stored in the database, and h) storing the analysis data in a database.

4. The method of claim 3 wherein the first engine is a Spider engine, the second engine is a JavaScript engine, and the database is a SQL database container.

5. The method of claim 3 further comprising the step of applying a set of fingerprint analyses to determine component type and its relationship to the web application.

6. The method of claim 3 further comprising the step of applying the correct set of security check and attack signatures against the web component.

7. The method of claim 3 further comprising repeating steps (d)-(h) for every new web component determined in step (c).

8. The method of claim 3 further comprising the step of transforming analysis data into a final portable format containing recommendations for fixing security vulnerabilities.

9. A system for analyzing web application security using a scanning apparatus comprising:
   a) a first engine to parse and separate web applications into web components;
   b) a second engine to interpret and analyze web scripts and detect new web components;
   c) using a scanning engine operatively and a set of web server patterns stored in a fingerprint database to determine of technology associated with each new component;
   d) said scanning engine operatively associated with a false-positive database to determine if the new web component is part of the web application;
   e) said scanning engine utilizing dynamic security check procedures against the new web component to determine any vulnerability; and
   f) said scanning engine being operatively associated with an attack signature database to determine any vulnerability within the new web component.

10. The system of claim 9 further comprising a database for storing the analysis results and a matrix of affected components and vulnerabilities.

* * * * *